US009329835B1

(12) United States Patent
Jain (10) Patent No.: US 9,329,835 B1
(45) Date of Patent: May 3, 2016

(54) SYSTEMS AND METHODS FOR PERFORMING MATHEMATICAL FUNCTIONS

(71) Applicant: Marvell International Ltd., Hamilton (BM)

(72) Inventor: Kapil Jain, Santa Clara, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 336 days.

(21) Appl. No.: 13/628,102

(22) Filed: Sep. 27, 2012

Related U.S. Application Data

(60) Provisional application No. 61/548,841, filed on Oct. 19, 2011.

(51) Int. Cl.
*G06F 7/575* (2006.01)

(52) U.S. Cl.
CPC ....................................... *G06F 7/575* (2013.01)

(58) Field of Classification Search
CPC ....... G06F 7/57; G06F 7/575; G06F 15/7867; G06F 9/3885
USPC .................................................. 708/200–714
See application file for complete search history.

(56) References Cited

U.S. PATENT DOCUMENTS

| 4,454,589 | A | * | 6/1984 | Miller ............................ 708/233 |
| 4,996,661 | A | * | 2/1991 | Cox et al. ....................... 708/508 |
| 5,333,284 | A | * | 7/1994 | Nugent .......................... 712/218 |
| 5,636,351 | A | * | 6/1997 | Lee .......................... G06F 7/483 |
| | | | | 708/209 |
| 2005/0144215 | A1 | * | 6/2005 | Simkins et al. ................ 708/620 |
| 2006/0184604 | A1 | * | 8/2006 | Takeuchi ....................... 708/620 |
| 2007/0239810 | A1 | * | 10/2007 | Lin et al. ....................... 708/209 |

OTHER PUBLICATIONS

Volder, Jack E.: "The CORDIC Trigonometric Computing Technique," IRE Trans. Electron. Comput. EC-8:330-334, pp. 226-230 (1959).
Mitchell, John N.: "Computer Multiplication and Division Using Binary Logarithms," IRE Transactions on Electronic Computers, pp. 512-517 (1962).
Sangregory et al.: "A Fast, Low-Power Logarithm Approximation with CMOS VLSI Implementation," pp. 388-391 (1999).

* cited by examiner

*Primary Examiner* — Andrew Caldwell
*Assistant Examiner* — Calvin M Brien (57) ABSTRACT

System and methods are provided for performing mathematical functions. An example system includes an instruction decoder configured to decode instructions for performing a mathematical function, an arithmetic logic unit having an alterable configuration to perform a combination of arithmetic operations, and a control unit configured to, based on the instructions decoded by the instruction decoder, output one or more control signals to the arithmetic logic unit. In response to the arithmetic logic unit receiving the one or more control signals, the configuration of the arithmetic logic unit is configured to be altered accordance with the one or more control signals such that the combination of arithmetic operations to be performed by the arithmetic logic unit is substantially equivalent to the mathematical function.

10 Claims, 11 Drawing Sheets

SYSTEMS AND METHODS FOR PERFORMING MATHEMATICAL FUNCTIONS

CROSS-REFERENCE TO RELATED APPLICATIONS

This disclosure claims priority to and benefit from U.S. Provisional Patent Application No. 61/548,841, filed on Oct. 19, 2011, the entirety of which is incorporated herein by reference.

FIELD

The technology described in this patent document relates generally to electric circuits, and more particularly to arithmetic logic unit (ALU) circuitry.

BACKGROUND

An arithmetic logic unit (ALU) is a fundamental building block of microprocessors. For example, microprocessors in modern central processing units of computers and graphics processing units accommodate powerful and complex arithmetic logic units. An arithmetic logic unit can be designed to perform arithmetic operations, such as addition and subtraction.

SUMMARY

In accordance with the teachings described herein, systems and methods are provided for performing mathematical functions. In one embodiment, a system includes an instruction decoder configured to decode instructions for performing a mathematical function, an arithmetic logic unit having an alterable configuration to perform a combination of arithmetic operations, and a control unit configured to, based on the instructions decoded by the instruction decoder, output one or more control signals to the arithmetic logic unit. In response to the arithmetic logic unit receiving the one or more control signals, the configuration of the arithmetic logic unit is configured to be altered in accordance with the one or more control signals such that the combination of arithmetic operations to be performed by the arithmetic logic unit is substantially equivalent to the mathematical function.

In another embodiment, a method is provided for performing mathematical functions. Instructions are received for performing a mathematical function and decoded. One or more control signals are generated based on the decoded instructions. The one or more control signals are received. An alterable configuration of an arithmetic logic unit is changed in accordance with the one or more control signals. A combination of arithmetic operations is performed using the arithmetic logic unit, the combination of arithmetic operations being substantially equivalent to the mathematical function.

In yet another embodiment, an integrated circuit is provided for performing mathematical functions. The integrated circuit includes an instruction decoder circuit configured to decode instructions for performing a mathematical function, an arithmetic logic unit circuit having an alterable configuration to perform a combination of arithmetic operations, and a control unit circuit configured to, based on the instructions decoded by the instruction decoder circuit, output one or more control signals to the arithmetic logic unit circuit. In response to the arithmetic logic unit circuit receiving the one or more control signals, the configuration of the arithmetic logic unit circuit is configured to be altered in accordance with the one or more control signals such that the combination of arithmetic operations to be performed by the arithmetic logic unit circuit is substantially equivalent to the mathematical function.

DETAILED DESCRIPTION

Usually, separate arithmetic logic units (ALUs) are needed for performing different elementary mathematical functions, which often requires substantial die space, additional routing resources (e.g., interconnect, wiring), and individualized logic. The present disclosure provides a unified ALU which is a general purpose ALU including a versatile architecture so that it can be used to perform a wide variety of elementary mathematical functions.

Figure 1:
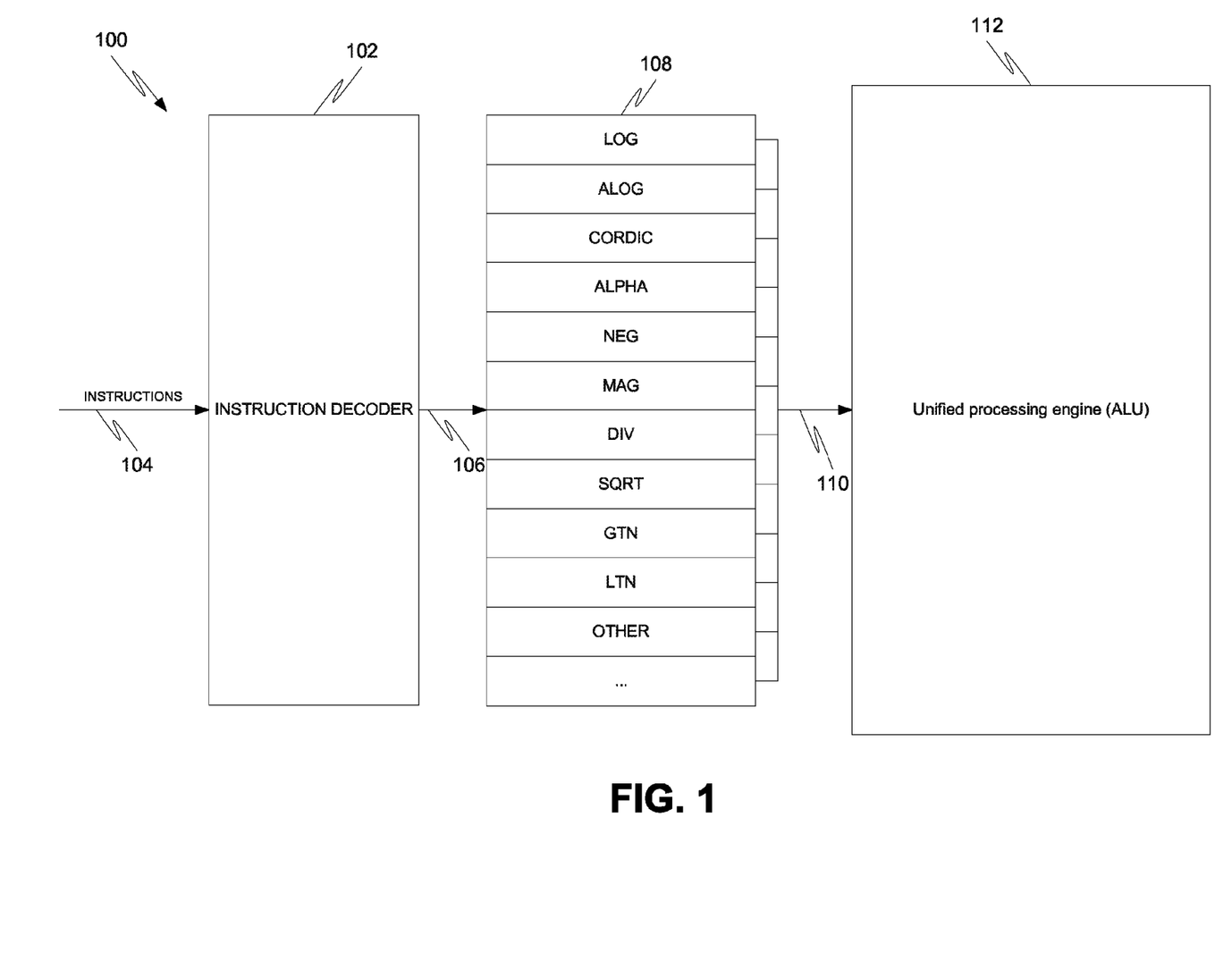
FIG. 1 illustrates an example processing system with a unified ALU.

FIG. 1 illustrates an example processing system 100 including a unified ALU. An instruction decoder 102 decodes instructions 104 and provides decoded instructions 106 to a control unit 108 which outputs control input values 110 to a unified ALU 112. The unified ALU 112 can generate approximate results (or results that are substantially equivalent, e.g., with a ±5% error) of a variety of elementary mathematical functions using a combination of basic arithmetic operations, such as shift, addition/subtraction and two's complement representations.

For example, the instructions 104 can be user instructions or computer commands, in another example, the control input values 110 are generated specifically for a particular mathematical function. Configuration of the unified ALU 112 may be changed in response to the control input values 110 for performing the mathematical function. A wide variety of mathematical functions can be performed using the unified ALU 112, such as Coordinate Rotation Digital Computer (CORDIC) computation, exponential averaging filter computation, logarithm computation, division, square root, negation, absolute, value computation, $\geq$, $\leq$, tan, cot, hyperbolic functions, and $n^{th}$ root calculation.

Figure 2:
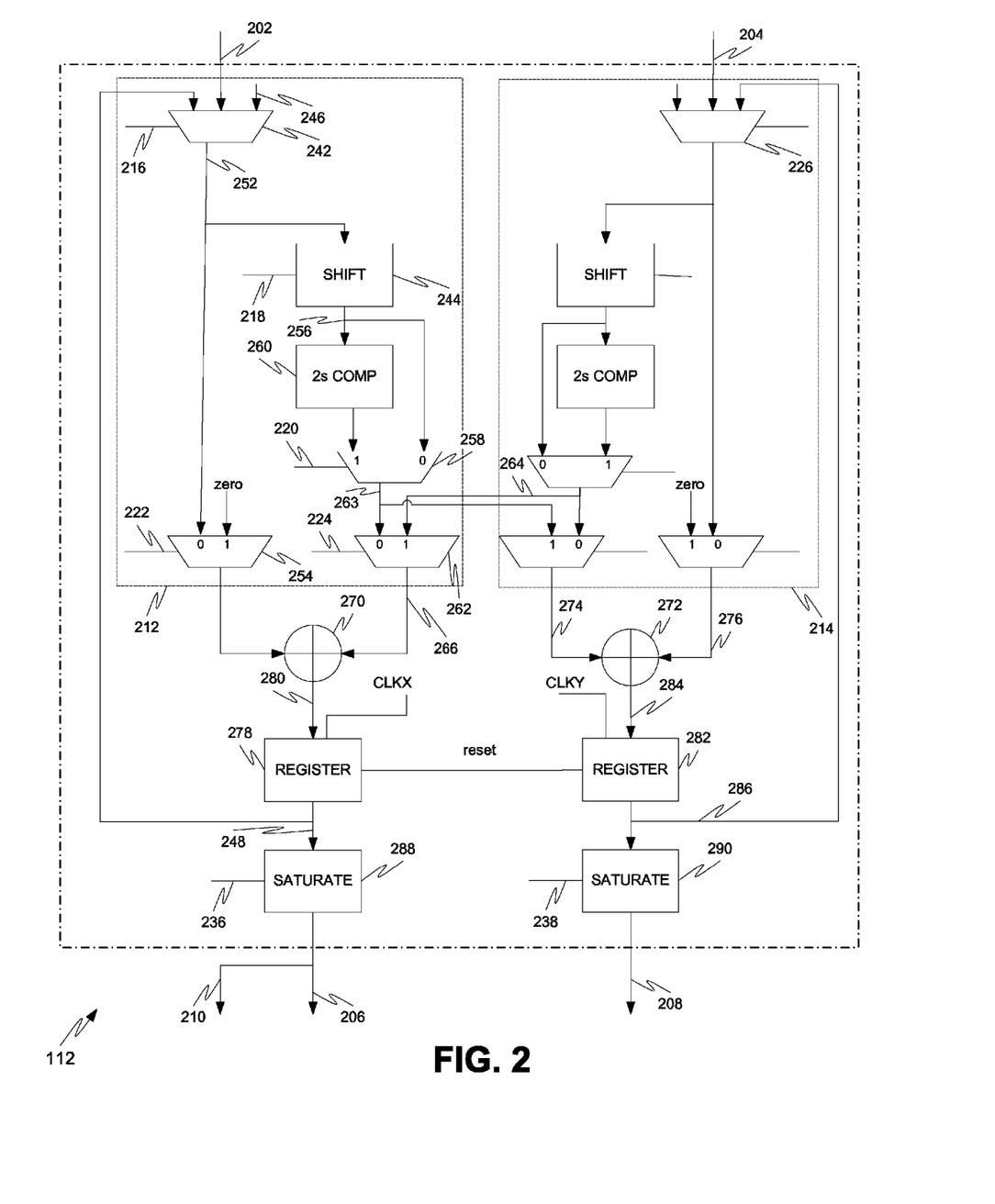
FIG. 2 illustrates an example of the unified ALU as shown in FIG. 1.

FIG. 2 illustrates an example of the unified ALU 112. The unified ALU 112 performs elementary mathematical functions on operands 202 and 204 according to a number of control input values, and generates two outputs 206 and 208. In some embodiments, the unified. ALU 112 generates an additional output 210 which is a most significant bit (MSB) of the output 206 corresponding to the sign of the output 206.

Specifically, the unified ALU 112 includes two pipelines 212 and 214 for processing the operands 202 and 204 respectively. As shown in FIG. 2, a multiplexer 242 in the pipeline 212 selects and outputs one of the operand 202, a control input value 246 and a feedback value 248 according to another control input value 216. A shift component 244 shifts an output value 252 that is received from the multiplexer 242 to the left (or to the right) for a certain number of bits to generate a shifted value 256 based on a control input value 218. In addition, a multiplexer 258 receives either the shifted value 256 from the shift component 254 or a complement representation of the shifted value 256 from a two's complement component 260 according to a control input value 220. Then, a multiplexer 262 outputs, depending on a control input value 224, either a value 263 received from the multiplexer 258 or a value 264 received from the pipeline 214 to an adder 270. Based on a control input value 222, another multiplexer 254 outputs either the value 252 or a zero to the adder 270 which in turn generates a sum value 280 to a register 278. The pipeline 214 includes similar components and operates similarly as the pipeline 212.

An adder 272 receives output values 274 and 276 from the pipeline 214, and generates a sum value 284 to a registered 282. The registers 278 and 282 provide feedback values 248 and 286 to the multiplexers 242 and 226 respectively for further iterations. When control input values 236 and 238 indicate that the computation is completed, saturation components 288 and 290 generate the outputs 206 and 208 respectively. The saturation component 288 may also generate the additional output 210 under proper circumstances.

Figure 3:
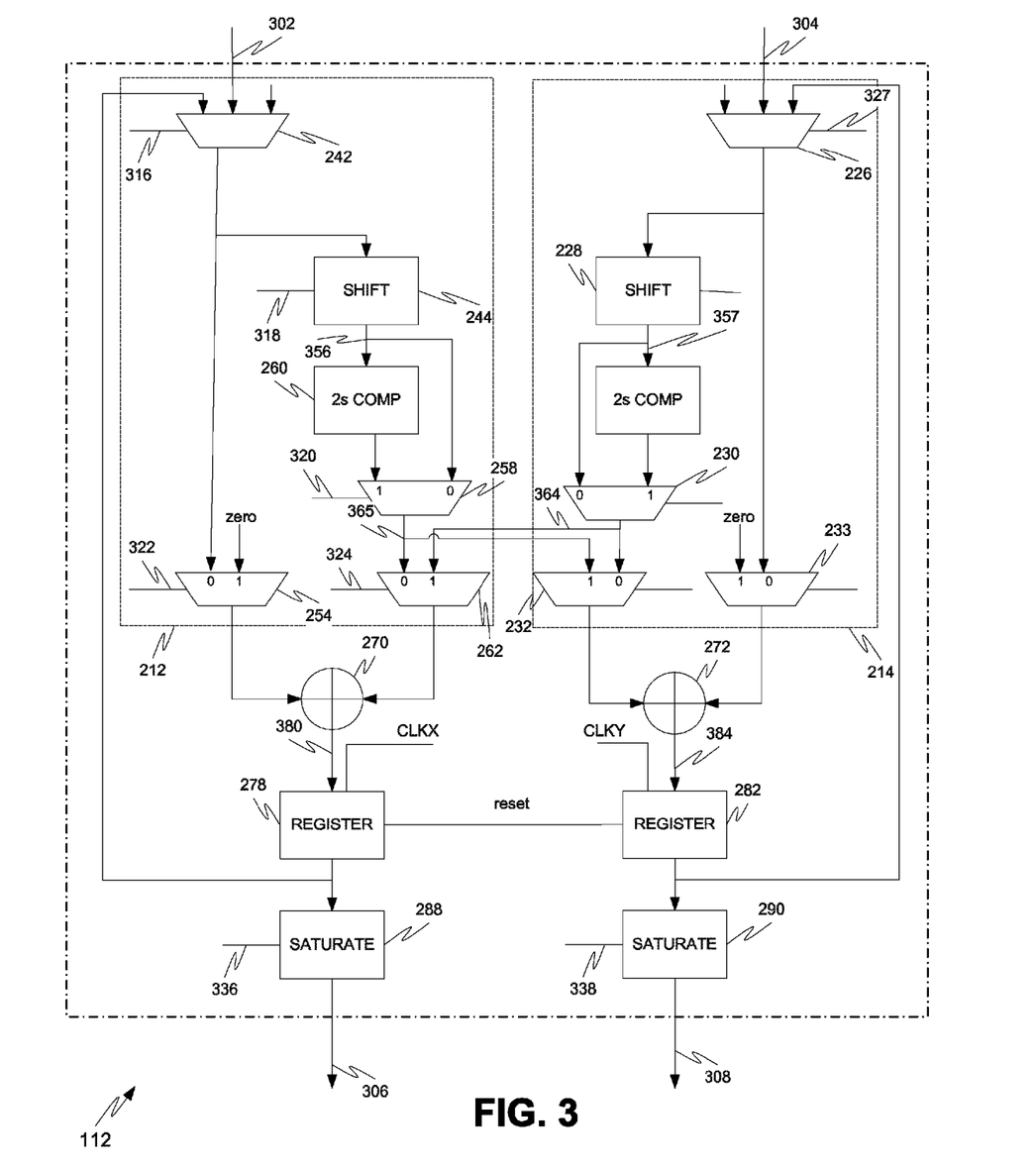
FIG. 3 illustrates an example of the unified ALU as shown in FIG. 2 performing a CORDIC computation.

FIG. 3 illustrates an example of the unified ALU 112 performing a CORDIC computation. The CORDIC computation is often used for solving the trigonometric relationships involved in plane coordinate rotation and conversion from rectangular to polar coordinates. For example, input values of the CORDIC computation are X=cos(θ), Y=sin(θ), and expected output values are $X_f$=cos(θ+λ), $Y_f$=sin(θ+λ), where λ represents an angle. The CORDIC computation can be carried out using the following approximation:

$$\alpha_i = \tan^{-1}(2^{-(i-2)})$$

$$\xi_1 = \text{sign}(\lambda_1)$$

$$\lambda_{i+1} = \lambda_i - \xi_i \times \alpha_i$$

$$X_{i+1} = X_i - Y_i \times 2^{-(i-2)} \times \xi_i$$

$$Y_{i+1} = Y_i + X_i \times 2^{-(i-2)} \times \xi_1 \qquad (1)$$

where i represents the ith iteration.

Referring to FIG. 1, the control unit 108 generates a number of particular control input values for the CORDIC computation. As shown in FIG. 3, the unified ALU 112 performs the CORDIC computation through a predetermined ined number of iterations and generates two outputs 306 (e.g., $X_f$), and 308 (e.g., $Y_f$).

Specifically, the multiplexer 242 in the pipeline 212 initially selects an operand 302 (e.g., $X_i$) according to a control input value 316. The shift component 244 shifts the value 302 to generate a shifted value 356 (e.g., $2^{-(i-2)}X_i$) according to a control input value 318. In addition, the multiplexer 258 receives the shifted value 356 and a complement representation of the shifted value 356 and outputs a value 365 (e.g., $\xi_i 2^{-(i-2)}X_i$) to a multiplexer 232 in the pipeline 214. The multiplexer 262 outputs a value 364 received from a multiplexer 230 in the pipeline 214 to the adder 270 when a control input value 324 is set to be "1," In addition, the multiplexer 226 in the pipeline 214 initially selects an operand 304 (e.g., $Y_i$) according to a control input value 327. The shift component 228 in the pipeline 214 shifts the value 304 to generate a shifted value 357 (e.g., $2^{-(i-2)}Y_i$), and the multiplexer 230 outputs a value 364 (e.g., $-\xi_i 2^{-(i-2)}Y_i$) to the multiplexer 262.

Moreover, the multiplexer 254 outputs the value 302 to the adder 270 which generates a sum value 380 (i.e., the sum of the value 302 and the value 364) to the register 278. Unless the last iteration is completed, the register 278 feeds the sum value 380 back to the multiplexer 242 to be used as a starting value for the next iteration. The multiplexer 232 outputs the value 365 (e.g., $\xi_i 2^{-(i-2)}X_i$) received from the multiplexer 258 in the pipeline 212 to the adder 272. In addition, the adder 272 receives the value 304 from the multiplexer 233 and outputs a sum value 384 (i.e., the sum of the value 304 and the value 365) to the register 282. Unless the last iteration is completed, the register 282 feeds the sum value 384 back to the multiplexer 226 to be used as a starting value for the next iteration. When control input values 336, 338 indicate that the last iteration is completed, the saturation components 288, 290 respectively generate the outputs 306, 308.

The accuracy of the CORDIC computation and other computations can be controlled by setting the number of iterations. A large number of iterations can be performed to achieve better accuracy, while a smaller number of iterations can be set if a higher speed is desired.

Figure 4A:
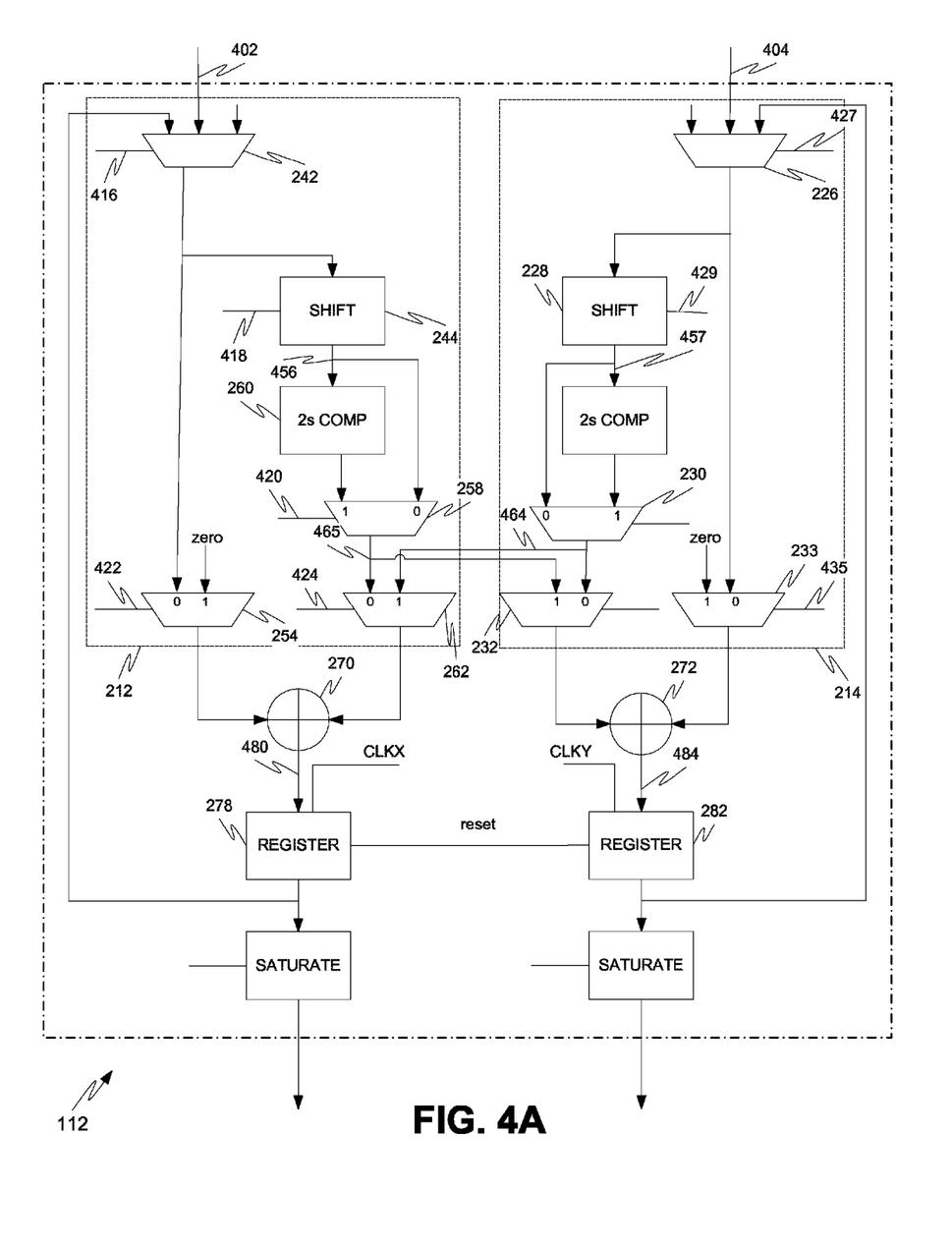
FIGS. 4A and 4B illustrate an example of the unified ALU as shown in FIG. 2 performing an exponential averaging filter computation.
Figure 4B:
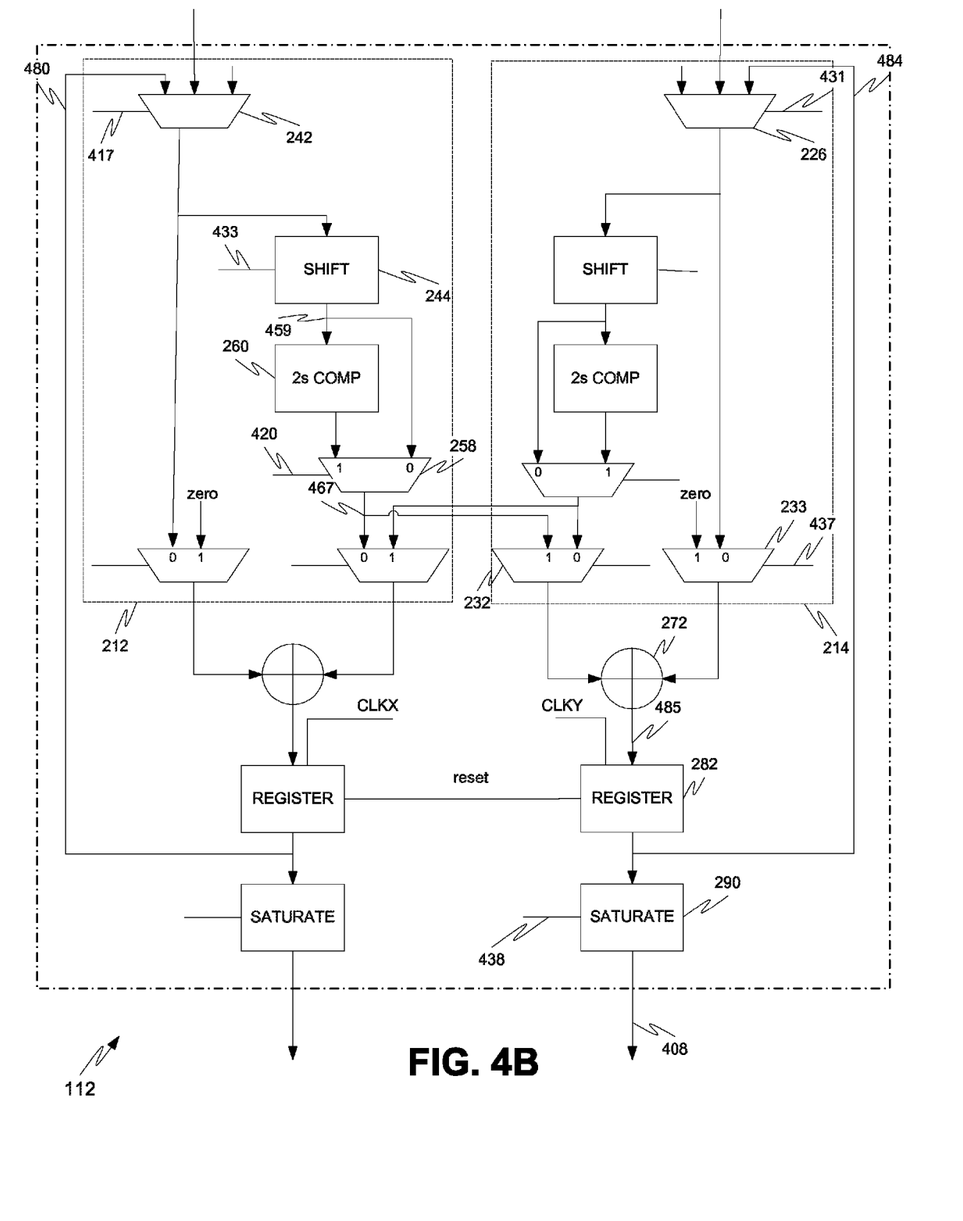

FIGS. 4A and 4B illustrate an example of the unified ALU 112 performing an exponential averaging filter computation. For example, input values of the exponential averaging filter computation are x(n) and y(n−1), and an output value is y(n). The exponential averaging filter computation can be carried out using the following approximation:

$$y(n) = (1 - \alpha)y(n-1) + \alpha x(n) \qquad (2)$$

$$y(n) = y(n-1) + \alpha[x(n) - y(n-1)]$$

$$\alpha = \frac{1}{2^N}$$

where N is an integer,

As shown in FIGS. 4A and 4B, the unified ALU 112 performs the exponential averaging filter computation through two cycles and generates an output 408 (e.g., y(n)). Specifically, FIG. 4A illustrates an example of the unified ALU 112 performing a first cycle of the exponential averaging filter computation. The multiplexer 242 in the pipeline 212 initially selects an operand 402 (e.g., x(n)) according to a control input value 416. The shift component 244 shifts the value 402 to generate a shifted value 456 (e.g., αx(n)) according to a control input value 418. In addition, the multiplexer 258 receives the shifted value 456 in response to a control input value 420 and outputs a value 465 (e.g., αx(n)) to a multiplexer 232 in the pipeline 214. The multiplexer 262 outputs a value 464 received from a multiplexer 230 in the pipeline 214 to the adder 270 when a control input value 424 is set to be "1." In addition, in response to a control input value 422, the multiplexer 254 outputs a zero to the adder 270 which generates a sum value 480 (i.e., the value 464) to the register 278. The register 278 feeds the sum value 480 back to the multiplexer 242 to be used as a starting value for the second cycle.

Moreover, the multiplexer 226 in the pipeline 214 initially selects an operand 404 (e.g., y(n−1)) according to a control input value 427. The shift component 228 in the pipeline 214 shifts the value 404 to generate a shifted value 457 (e.g., αy(n−1)) according to a control input value 429. The multiplexer 230 receives the two's complement representation of the shifted value 457 and outputs the value 464 (e.g., −αy(n−1)) to the multiplexer 262. The multiplexer 232 outputs the value 465 (e.g., αx(n)) received from the multiplexer 258 in the pipeline 212 to the adder 272. In addition, the adder 272 receives the value 404 from the multiplexer 233 in response to a control input value 435, and outputs a sum value 484 (e.g., y(n−1)+αx(n)) to the register 282. The register 282 feeds the sum value 484 back to the multiplexer 226 to be used as a starting value for the second cycle.

FIG. 4B illustrates an example of the unified ALU 112 performing the second cycle of the exponential averaging filter computation. The multiplexer 242 in the pipeline 212 selects the value 480 (e.g., −αy(n−1)) according to a control input value 417. The shift component 244 shifts the value 480 to generate a shifted value 459 (e.g., −αy(n−1)) according to a control input value 433. The multiplexer 258 receives the shifted value 459 in response to the control input value 420 and outputs a value 467 (e.g., −αy(n−1)) to a multiplexer 232 in the pipeline 214.

In addition, the multiplexer 226 in the pipeline 214 selects the value 484 (e.g., y(n−1)+αx(n)) according to a control input value 431. The multiplexer 232 outputs the value 467 (e.g., −αy(n−1)) received from the multiplexer 258 in the pipeline 212 to the adder 272. In addition, the adder 272 receives the value 484 from the multiplexer 233 in response to a control input value 437 and outputs a sum value 485 (e.g., y(n−1)+αx(n)−αy(n−1)) to the register 282. Then, the saturation component 290 generates the output 408 (e.g., y(n)) when a control input value 438 indicates that the second cycle is completed.

Figure 5A:
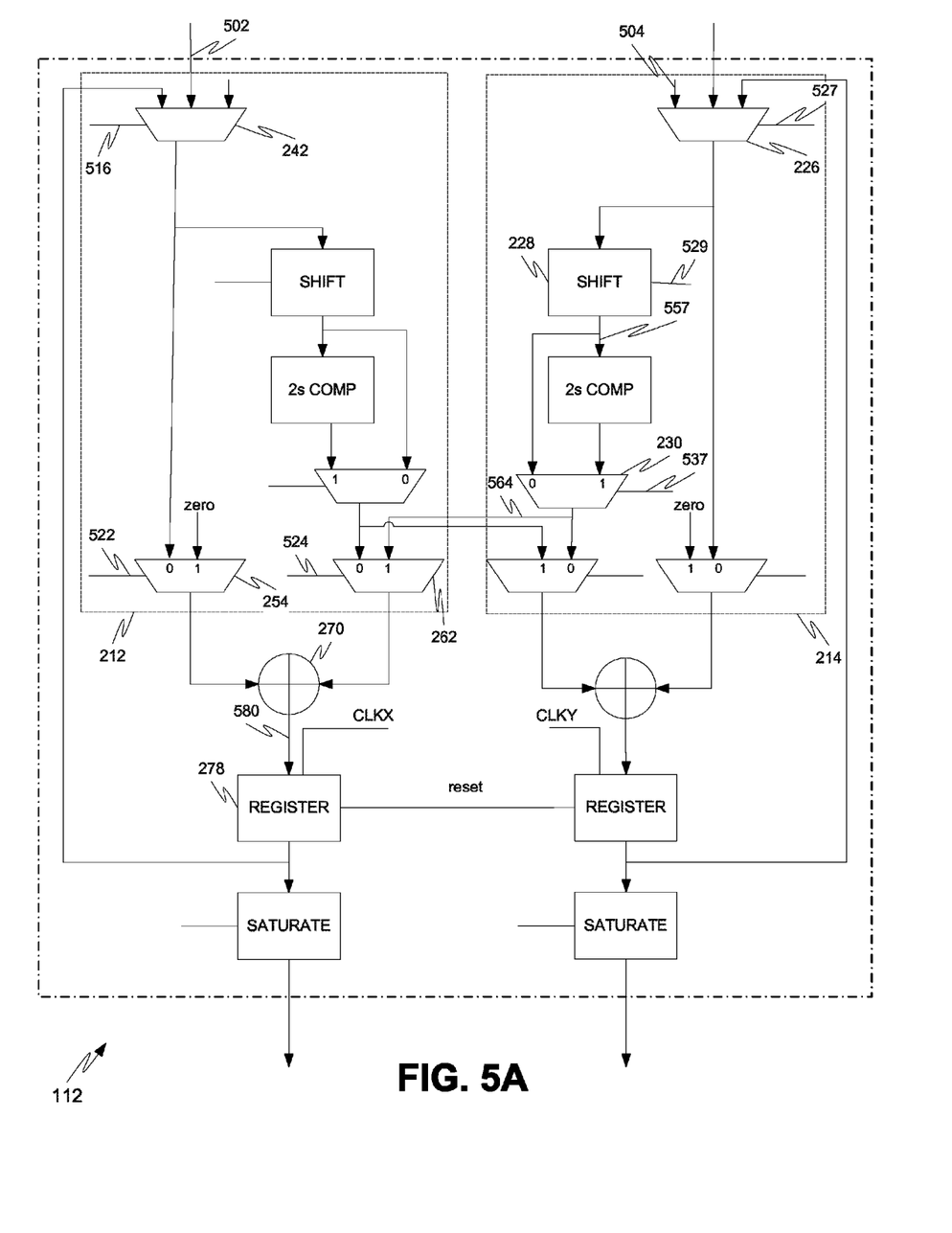
FIGS. 5A and 5B illustrate an example of the unified ALU as shown in FIG. 2 performing an analog computation.
Figure 5B:
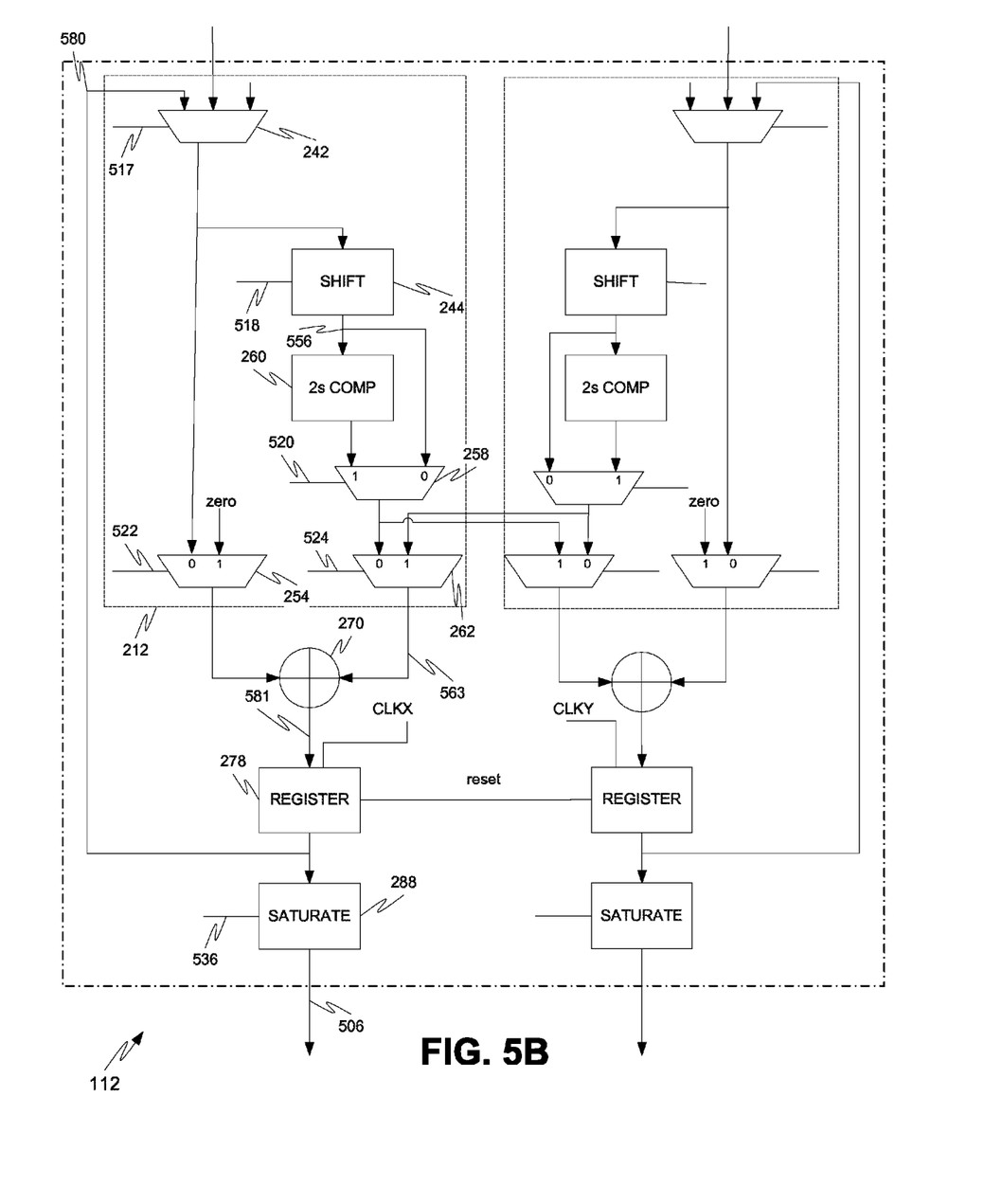

FIGS. 5A and 5B illustrate an example of the unified ALU 112 performing an antilog computation. The antilog computation is used for calculating an inverse function of a logarithm. For example, an input value of the antilog computation is X, and an expected output value is Y=2^x. The antilog computation can be carried out using the following approximation:

$$X = I + F$$

$$Y = (1+F) \times 2^I \quad (3)$$

where I represents an integer, and F represents a fractional number.

As shown in FIGS. 5A and 5B, the unified ALU 112 performs the antilog computation through two cycles and generates an output 506 (e.g., Y). Specifically, FIG. 5A illustrates an example of the unified ALU 112 performing a first cycle of the antilog computation. The multiplexer 242 in the pipeline 212 initially selects an operand 502 (e.g., F) according to a control input value 516. The multiplexer 254 receives and outputs the value 502 to the adder 270 based on a control input value 522. In addition, the multiplexer 226 in the pipeline 214 initially selects a control input value 504 (e.g., "1") according to another control input value 527. The shift component 228 receives the value 504 and generates a shifted value 557 (e.g., "1") based on a control input value 529. The multiplexer 230 receives the shifted value 557 and outputs a value 564 (e.g., "1") to the multiplexer 262 according to a control input value 537. Further, the adder 270 receives the value 564 and outputs a sum value 580 (e.g., 1+F) to the register 278. The register 278 feeds the sum value 580 back to the multiplexer 242 to be used as a starting value for the second cycle.

FIG. 5B illustrates an example of the unified ALU 112 performing the second cycle of the antilog computation. The multiplexer 242 in the pipeline 212 selects the value 580 (e.g., 1+F) according to a control input value 517. The shift component 244 shifts the value 580 to generate a shifted value 556 (e.g., $(1+F) \times 2^I$) according to a control input value 518. In addition, the multiplexer 258 receives and outputs the shifted value 556 based on a control input value 520 (e.g., "0"). The multiplexer 262 outputs a value 563 to the adder 270 in response to a control input value 524 (e.g., "0"). In addition, the multiplexer 254 receives and outputs a zero when the control input value 522 is set to be "1." The adder 270 generates a sum value 581 (e.g., $(1+F) \times 2^I$) to the register 278. Then, the saturation component 288 generates the output 506 (e.g., Y) when a control input value 536 indicates that the second cycle is completed.

Figure 6:
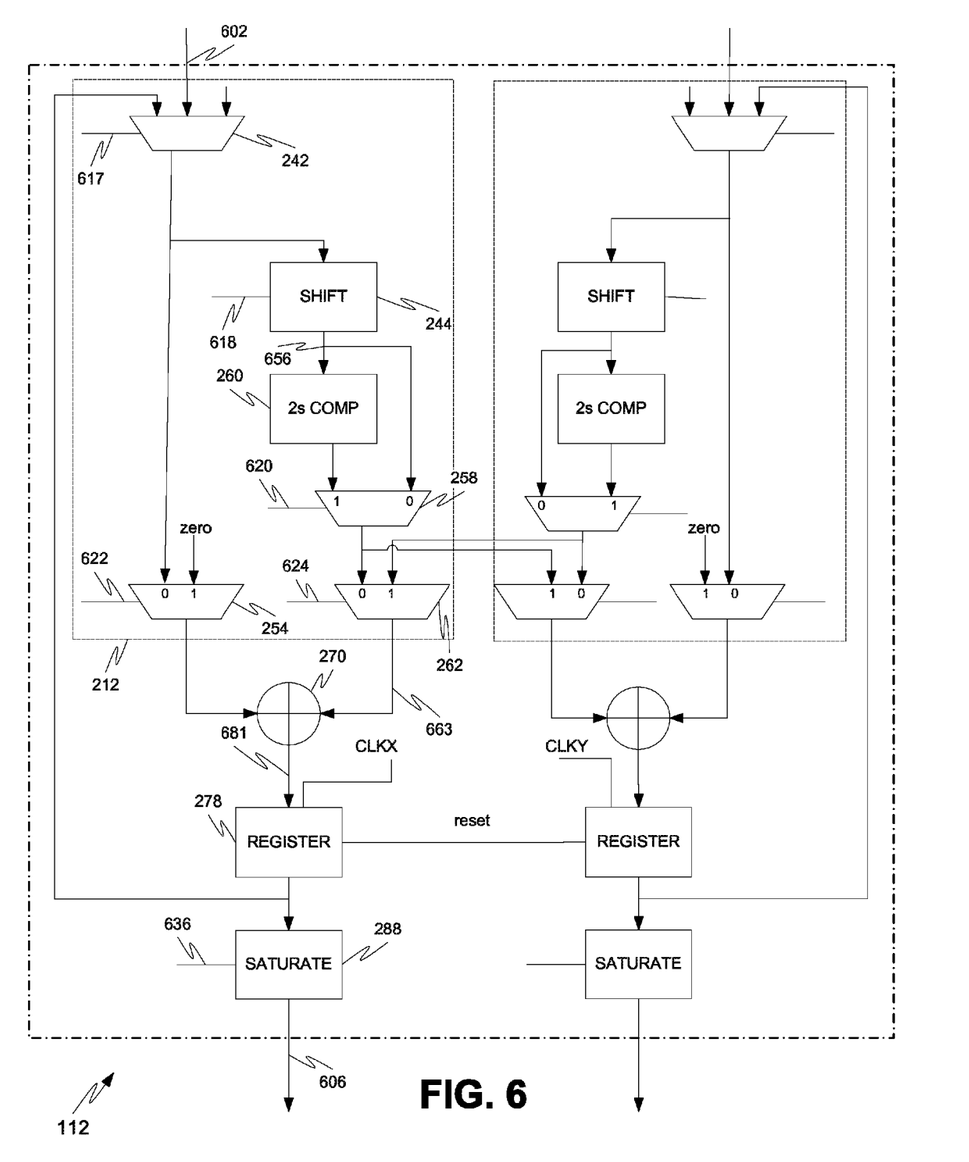
FIG. 6 illustrates an example of the unified ALU as shown in FIG. 2 performing a negation computation.

FIG. 6 illustrates an example of the unified ALU 112 performing a negation computation. For example, an input value of the negation computation is X, and an output value is Y=−X. The unified ALU 112 carries out the negation computation through one cycle and generates an output 606 (e.g., Y). The multiplexer 242 in the pipeline 212 selects an operand 602 (e.g., X) according to a control input value 617. The shift component 244 generates a shifted value 656 (e.g., X), and the two's complement component 260 outputs a two's complement representation of the shifted value 656 (e.g., −X). The multiplexer 258 receives and outputs the two's complement representation of the shifted value 656 when a control input value 620 is set to be "1." The multiplexer 262 outputs a value 663 to the adder 270 in response to a control input value 624 (e.g., "0"). In addition, the multiplexer 254 receives and outputs a zero when the control input value 622 is set to be "0." The adder 270 generates a sum value 681 (e.g., −X) to the register 278. Then, the saturation component 288 generates the output 606 (e.g., Y) when a control input value 636 indicates that the cycle is completed.

Figure 7:
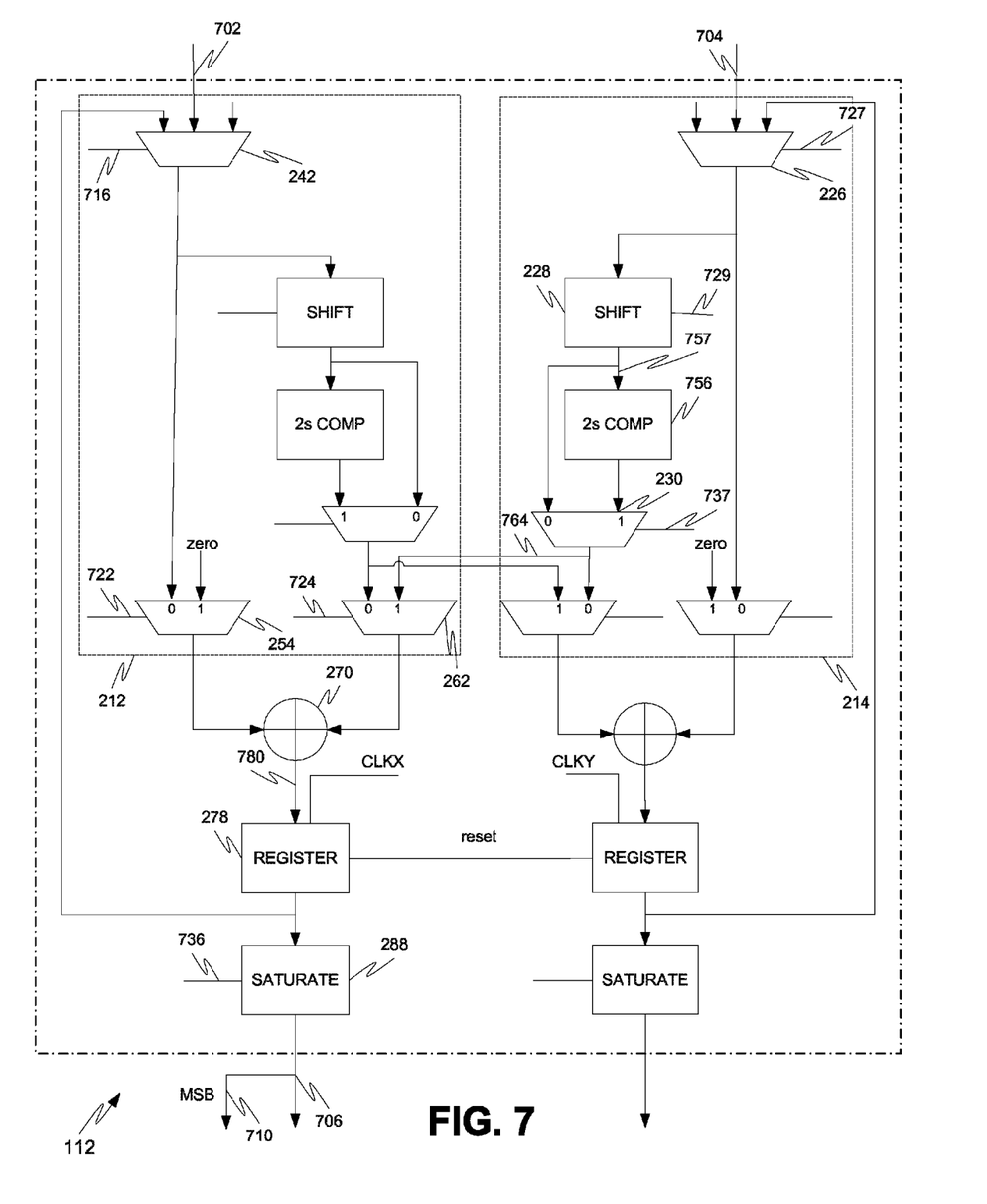
FIG. 7 illustrates an example of the unified ALU as shown in FIG. 2 performing a comparison.

FIG. 7 illustrates an example of the unified ALU 112 performing a comparison. For example, input values of the comparison are X and Y, and an output value is 0 if X≥X or 1 if X<Y. As shown in FIG. 7, the unified ALU 112 performs the comparison through one cycle and generates an output 710 (e.g., 0 or 1). The multiplexer 242 in the pipeline 212 initially selects an operand 702 (e.g., X) according to a control input value 716. The multiplexer 254 receives and outputs the value 702 to the adder 270 based on a control input value 722. In addition, the multiplexer 226 in the pipeline 214 initially selects a control input value 704 (e.g., Y) according to another control input value 727. The shift component 228 receives the value 704 and generates a shifted value 757 (e.g., Y) based on a control input value 729. The two's complement component 756 outputs a two's complement representation of the shifted value 757 (e.g., −Y). The multiplexer 230 receives and outputs the two's complement representation of the shifted value 757 when a control input value 737 is set to be "1." In response to a control input value 724 (e.g., "1"), the multiplexer 262 receives and outputs a value 764 to the adder 270 which outputs a sum value 780 (e.g., X−Y) to the register 278. When a control input value 736 indicates that the cycle is completed, the saturation component 288 generates the output 710 which represents a most significant bit of the output 706.

Figure 8A:
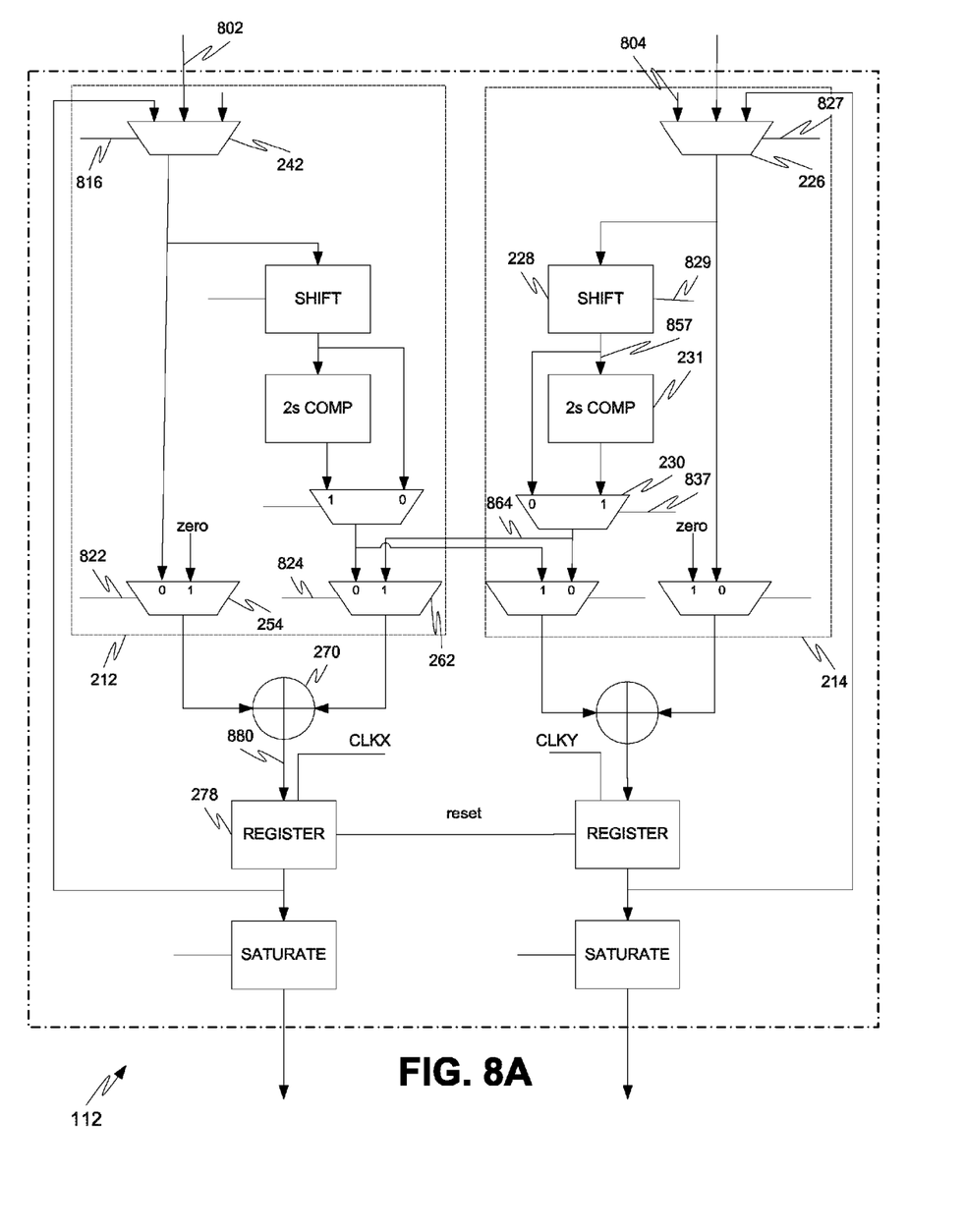
FIGS. 8A and 8B illustrate an example of the unified ALU as shown in FIG. 2 performing a logarithm computation.
Figure 8B:
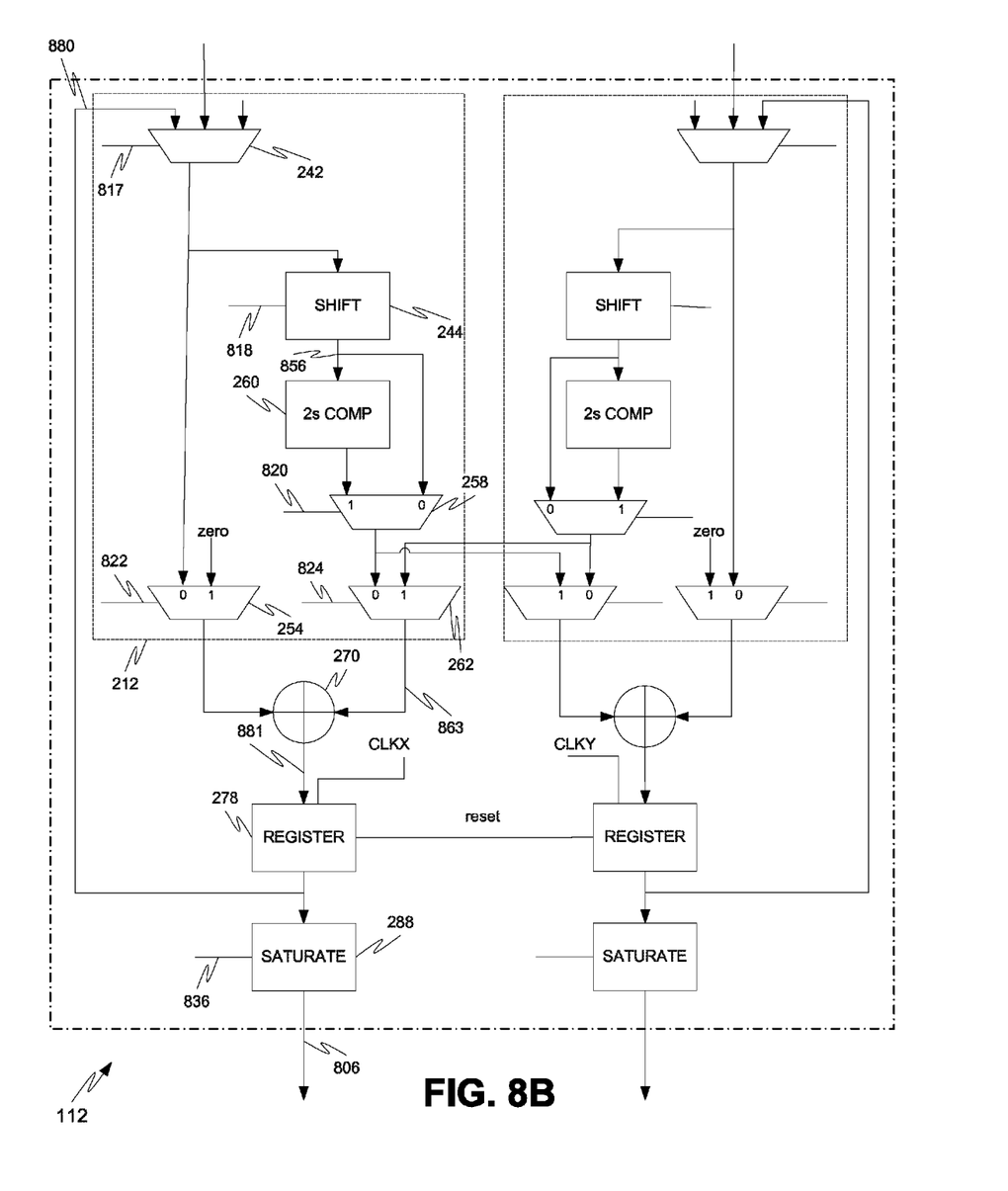

FIGS. 8A and 8B illustrate an example of the unified ALU 112 performing a logarithm computation. For example, an input value of the antilog computation is X, and an expected output value is Y=$\log_2$(X). The logarithm computation can be carried out using the following approximation:

$$Y = I + F$$

$$F = F_m + F_s$$

$$F_m = X - 2^I$$

$$F_s = F_m >> N$$

$$I = \text{Leading One Position} \quad (4)$$

As shown in FIGS. 8A and 8B, the unified ALU 112 performs the logarithm computation through two cycles and generates an output 806 (e.g., Y). Specifically, FIG. 8A illustrates an example of the unified ALU 112 performing a first cycle of the logarithm computation. The multiplexer 242 in the pipeline 212 initially selects an operand 802 (e.g., X) according to a control input value 816. The multiplexer 254 receives and outputs the value 802 to the adder 270 based on a control input value 822. In addition, the multiplexer 226 in the pipeline 214 initially selects a control input value 804 (e.g., "1") according to another control input value 827. The shift component 228 receives the value 804 and generates a shifted value 857 (e.g., $2^I$) based on a control input value 829. The two's complement component 231 outputs a two's complement representation of the shifted value 857 (e.g., $-2^I$). The multiplexer 230 receives and outputs the two's complement representation of the shifted value 857 when a control input value 837 is set to be "1." In response to a control input value 824 (e.g., "1"), the multiplexer 262 receives and outputs a value 864 to the adder 270 which outputs a sum value 880 (e.g., $F_m = X - 2^I$) to the register 278. The register 278 feeds the sum value 880 back to the multiplexer 242 to be used as a starting value for the second cycle.

FIG. 8B illustrates an example of the unified ALU 112 performing the second cycle of the logarithm computation. The multiplexer 242 in the pipeline 212 selects the value 880 (e.g., $F_m = X - 2^I$) according to a control input value 817. The shift component 244 shifts the value 880 to generate a shifted value 856 (e.g., $F_s = F_m / 2^N$) according to a control input value 818. In addition, the multiplexer 258 receives and outputs the shifted value 856 based on a control input value 820 (e.g., "0"). The multiplexer 262 outputs a value 863 to the adder 270 in response to a control input value 824 (e.g., "0"). In addition, the multiplexer 254 receives and outputs the value 880 to the adder 270 when the control input value 822 is set to be "0." The adder 270 generates a sum value 881 (e.g., $F_m + F_s$) to the register 278. Then, the saturation component 288 generates the output 806 (e.g., Y) when a control input value 836 indicates that the second cycle is completed.

This written description uses examples to disclose the invention, include the best mode, and also to enable a person skilled in the art to make and use the invention. The patentable scope of the invention may include other examples that occur to those skilled in the art.

For example, the systems and methods described herein may be implemented on many different types of processing devices by program code comprising program instructions that are executable by the device processing subsystem. Other implementations may also be used, however, such as firmware or appropriately designed hardware configured to carry out the methods and systems described herein. In another example, the systems and methods described herein may be implemented in an independent processing engine, as a co-processor, or as a hardware accelerator. In yet another example, the systems described herein may be implemented using CMOS logic gates. In yet another example, the systems and methods described herein provide an ultra-low-power and low-cost solution for performing mathematical functions. In yet another example, the systems and methods described herein may be provided on many different types of computer-readable media including computer storage mechanisms (e.g., CD-ROM, diskette, RAM, flash memory, computer's hard drive, etc.) that contain instructions e.g., software) for use in execution by a processor to perform the methods' operations and implement the systems described herein.

What is claimed is:

1. A system comprising:
   an instruction decoder configured to decode instructions for performing a mathematical function;
   an arithmetic logic unit (ALU) having an alterable configuration to perform a combination of arithmetic operations;
   a control unit configured to, based on the instructions decoded by the instruction decoder, output one or more control signals to the ALU,
   wherein in response to the ALU receiving the one or more control signals, the configuration of the ALU is configured to be altered in accordance with the one or more control signals such that the combination of arithmetic operations to be performed by the ALU is substantially equivalent to the mathematical function;
   wherein the ALU includes:
     a first pipeline configured to generate a first plurality of pipeline output signals;
     a first combination component configured to combine the first plurality of pipeline output signals and generate a first combined signal for feeding back to the first pipeline to perform a plurality of iterations of the arithmetic operations;
     a second pipeline configured to generate a second plurality of pipeline output signals;
     a second combination component configured to combine the second plurality of pipeline output signals and generate a second combined signal for feeding back to the second pipeline to perform the plurality of iterations of the arithmetic operations;
     a first multiplexer configured to output one of a first input signal, a first feedback signal and a value as a first selection signal in response to a first control signal;
     a first shifting component configured to shift the first selection signal to generate a first shifted signal in response to a second control signal;
     a first complement component configured to generate a first complement signal of the first shifted signal;
     a second multiplexer configured to output one of a second input signal, a second feedback signal and a third input signal as a second selection signal in response to a third control signal;
     a second shifting component configured to shift the second selection signal to generate a second shifted signal in response to a fourth control signal;
     a second complement component configured to generate a second complement signal of the second shifted signal;
     a third multiplexer configured to output one of the first shifted signal and the first complement signal as a third selection signal in response to a fifth control signal;
     a fourth multiplexer configured to output one of the second shifted signal and the second complement signal as a fourth selection signal in response to a sixth control signal;
     a fifth multiplexer configured to output one of the first selection signal and a first reference signal as a fifth selection signal in response to an seventh control signal;
     a sixth multiplexer configured to output one of the second selection signal and a second reference signal as a sixth selection signal in response to a eighth control signal;
     a seventh multiplexer configured to output one of the third selection signal and the fourth selection signal as a seventh selection signal in response to a ninth control signal;

an eighth multiplexer configured to output one of the third selection signal and the fourth selection signal as an eighth selection signal in response to an tenth control signal;

wherein the first combination component is configured to combine the fifth selection signal and the seventh selection signal to generate the first combined signal related to the first feedback signal, and the second combination component is configured to combine the sixth selection signal and the eighth selection signal to generate the second combined signal related to the second feedback signal.

2. The system of claim 1, wherein the ALU includes one or more configurable shifting components, one or more configurable two's complement components, and one or more configurable addition components;

wherein in response to the ALU receiving the one or more control signals, configurations of the one or more configurable shifting components, the one or more configurable two's complement components, and the one or more configurable addition components are altered such that the combination of arithmetic operations to be performed by the ALU is substantially equivalent to the mathematical function.

3. The system of claim 1, wherein the arithmetic logic unit further includes:

a first register configured to receive the first combined signal and output the first feedback signal at a first time; and a second register configured to receive the second combined signal and output the second feedback signal at a second time.

4. The system of claim 3, wherein the arithmetic logic unit further includes:

a first saturation component configured to receive the first feedback signal and generate a first output signal after a first predetermined number of iterations; and a second saturation component configured to receive the second feedback signal and generate a second output signal after a second predetermined number of iterations.

5. The system of claim 4, wherein the arithmetic logic unit is further configured to increase the first predetermined number of iterations to improve accuracy of performing the mathematical function.

6. The system of claim 4, wherein the arithmetic logic unit is further configured to decrease the first predetermined number of iterations to improve a speed of performing the mathematical function.

7. The system of claim 1, wherein the arithmetic operations include shifting, addition, subtraction, and two's complement calculation.

8. A method comprising:

receiving instructions for performing a mathematical function;

decoding the instructions;

generating one or more control signals based on the decoded instructions;

receiving the one or more control signals;

changing an alterable configuration of an arithmetic logic unit (ALU) in accordance with the one or more control signals;

performing a combination of arithmetic operations using the ALU, the combination of arithmetic operations being substantially equivalent to the mathematical function;

wherein performing the combination of arithmetic operations using the ALU includes:

generating a first plurality of pipeline output signals;

combining the first plurality of pipeline output signals;

generating a first combined signal for feeding back to the ALU to perform a plurality of iterations of the arithmetic operations;

generating a second plurality of pipeline output signals;

combining the second plurality of pipeline output signals; and generating a second combined signal for feeding back to the ALU to perform the plurality of iterations of the arithmetic operations;

outputting one of a first input signal, a first feedback signal and a value as a first selection signal in response to a first control signal;

shifting the first selection signal to generate a first shifted signal in response to a second control signal;

generating a first complement signal of the first shifted signal;

outputting one of a second input signal, a second feedback signal and a third input signal as a second selection signal in response to a third control signal;

shifting the second selection signal to generate a second shifted signal in response to a fourth control signal;

generating a second complement signal of the second shifted signal;

outputting one of the first shifted signal and the first complement signal as a third selection signal in response to a fifth control signal;

outputting one of the second shifted signal and the second complement signal as a fourth selection signal in response to a sixth control signal;

outputting one of the first selection signal and a first reference signal as a fifth selection signal in response to an seventh control signal;

outputting one of the second selection signal and a second reference signal as a sixth selection signal in response to a eighth control signal;

outputting one of the third selection signal and the fourth selection signal as a seventh selection signal in response to a ninth control signal;

outputting one of the third selection signal and the fourth selection signal as an eighth selection signal in response to an tenth control signal;

combining the fifth selection signal and the seventh selection signal to generate the first combined signal related to the first feedback signal; and combining the sixth selection signal and the eighth selection signal to generate the second combined signal related to the second feedback signal.

9. The method of claim 8, wherein changing the alterable configuration of the ALU in accordance with the one or more control signals includes:

changing configurations of one or more configurable shifting components, one or more configurable two's complement components and one or more configurable addition components that are included in the ALU in accordance with the one or more control signals.

10. The method of claim 9, and further comprising:

adjusting input parameters of the one or more configurable shifting components, the one or more configurable two's complement components or the one or more configurable addition components in response to the one or more control signals.

* * * * *